US009469152B2

(12) United States Patent
Hoepner et al.

(10) Patent No.: US 9,469,152 B2
(45) Date of Patent: Oct. 18, 2016

(54) METHOD, APPARATUS AND ENVELOPING SYSTEM AND ELECTRONIC INTERFACE FOR ELECTRONIC COMMUNICATION WITH A SYSTEM OR APPARATUS FOR THE ORDER-BASED PROCESSING OF FLAT ITEMS

(71) Applicant: Böwe Systec GmbH, Augsburg (DE)

(72) Inventors: Bernd Hoepner, Augsburg (DE); Thomas Huber, Stadtbergen (DE); Robert Bayer, Diedorf (DE); Stefan Streil, Augsburg (DE); Helmut Schuessler, Augsburg (DE)

(73) Assignee: Böwe Systec GmbH, Augsburg (DE)

(*) Notice: Subject to any disclaimer, the term of this patent is extended or adjusted under 35 U.S.C. 154(b) by 0 days.

(21) Appl. No.: 14/398,352

(22) PCT Filed: Oct. 24, 2012

(86) PCT No.: PCT/DE2012/001029
§ 371 (c)(1),
(2) Date: Oct. 31, 2014

(87) PCT Pub. No.: WO2013/163969
PCT Pub. Date: Nov. 7, 2013

(65) Prior Publication Data
US 2015/0127144 A1 May 7, 2015

(30) Foreign Application Priority Data
May 2, 2012 (DE) ........................ 10 2012 008 511

(51) Int. Cl.
*G06F 7/00* (2006.01)
*B65H 39/00* (2006.01)
(Continued)

(52) U.S. Cl.
CPC ................ *B43M 3/04* (2013.01); *B65H 39/00* (2013.01); *B65H 33/04* (2013.01)

(58) Field of Classification Search
CPC ......... B43M 3/04; B65H 33/04; B65H 39/00
USPC ........................... 700/220; 270/32, 45, 58.06
See application file for complete search history.

(56) References Cited

U.S. PATENT DOCUMENTS 4,517,650 A * 5/1985 Gomes ..................... B43M 3/04 270/58.01
5,339,603 A 8/1994 Gombault et al.
(Continued)

FOREIGN PATENT DOCUMENTS

DE 692 02 774 T2 3/1996
DE 600 11 864 T2 8/2005
(Continued)

OTHER PUBLICATIONS

International Search Report of PCT/DE2012/001029, mailed Aug. 2, 2013, (5 pages).

*Primary Examiner* — Mark Beauchaine
(74) *Attorney, Agent, or Firm* — Collard & Roe, P.C.

(57) ABSTRACT

An electronic interface for electronic communication includes a system or apparatus for the order-based processing of flat items that can be categorized into flat item types. The interface has an exclusive input of formulations that combine features of flat item types to be processed in an order and the processing steps performed in the processing system, and/or for the order-based processing of orders according to which a specific amount of specific flat items are to be processed in accordance with one or more formulations, allows sources of error to be reduced.

16 Claims, 9 Drawing Sheets

Figure 1:
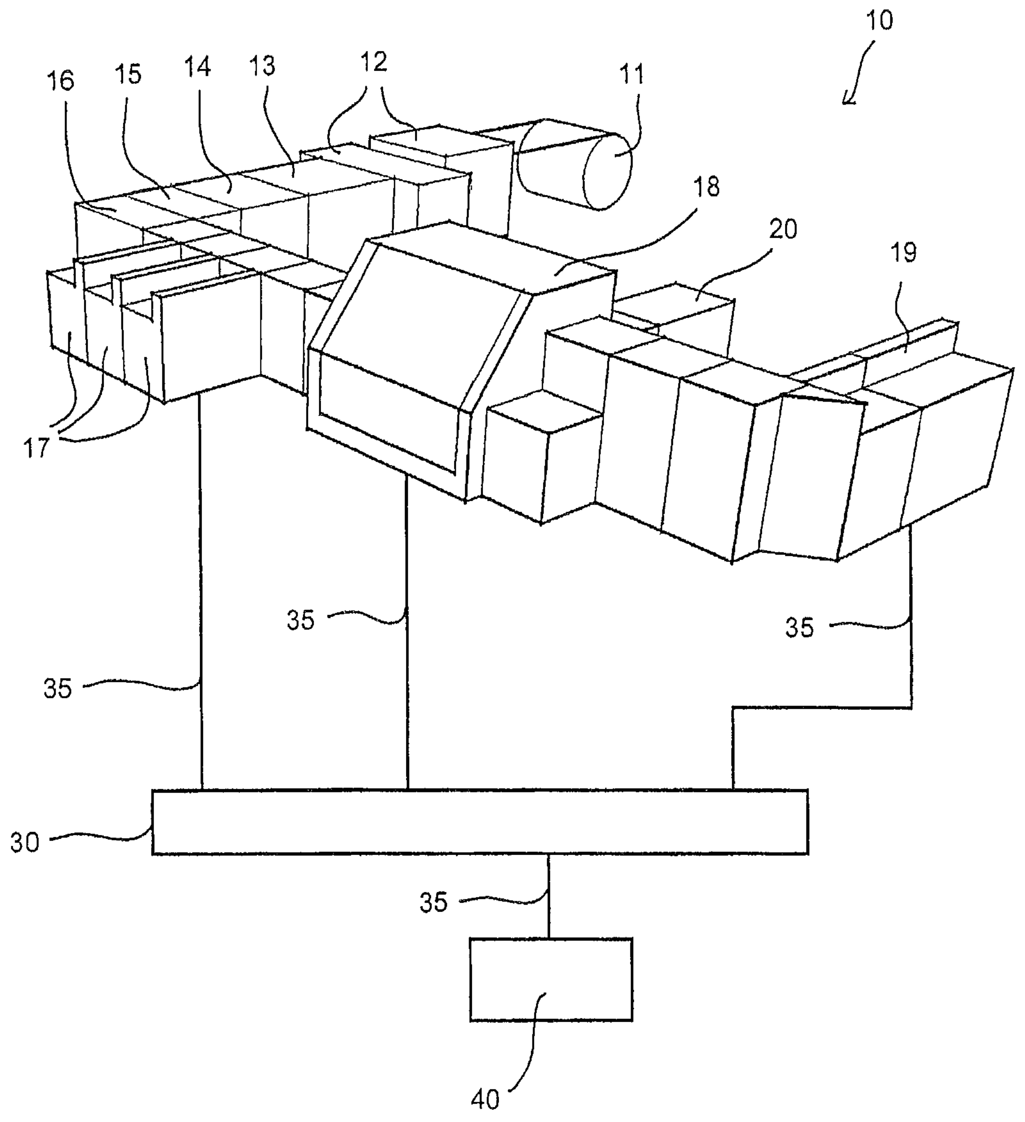

(51) Int. Cl.
*B43M 3/04* (2006.01)
*B65H 33/04* (2006.01)

(56) References Cited

U.S. PATENT DOCUMENTS

| | | | |
|---|---|---|---|
| 6,412,255 B2 | 7/2002 | Hidding et al. | |
| 6,561,502 B1 * | 5/2003 | Flickner | B43M 3/04 270/58.06 |
| 7,765,017 B2 | 7/2010 | Fijnvandraat | |
| 7,896,335 B2 | 3/2011 | Stemmle | |
| 2010/0269555 A1 | 10/2010 | Theis et al. | |
| 2011/0029126 A1 | 2/2011 | Van Gorp et al. | |

FOREIGN PATENT DOCUMENTS

| | | | |
|---|---|---|---|
| EP | 0 754 500 | A1 | 1/1997 |
| EP | 1 081 073 | A2 | 3/2001 |
| EP | 1 939 011 | A1 | 7/2008 |
| WO | 2004/089646 | A1 | 10/2004 |

* cited by examiner

Fig. 2

| |
|---|
| Order number |
| Number of letters |
| FL type A |
| Width |
| Length |
| Thickness |
| Position code |
| .... |
| FL type B |
| Width |
| Length |
| .... |
| FL type C |
| Format |
| .... |
| .... |

METHOD, APPARATUS AND ENVELOPING SYSTEM AND ELECTRONIC INTERFACE FOR ELECTRONIC COMMUNICATION WITH A SYSTEM OR APPARATUS FOR THE ORDER-BASED PROCESSING OF FLAT ITEMS

CROSS REFERENCE TO RELATED APPLICATIONS

This application is the National Stage of PCT/DE2012/001029 filed on Oct. 24, 2012, which claims priority under 35 U.S.C. 5119 of German Application No. 10 2012 008 511.7 filed on May 2, 2012, the disclosure of which is incorporated by reference. The international application under PCT article 21(2) was not published in English.

The invention relates, on the one hand, to a method for processing of flat items in a processing system, through which system the flat items, in order-based manner, grouped into orders, successively pass through at least one flat item channel, whereby the flat items can be configured differently at least in terms of one characteristic, in each instance, particularly a physical characteristic, in accordance with their flat item type, and at least one interaction device that interacts physically with the flat items, in each instance, is provided along the flat item channel, which device is adapted to setting data predetermined in accordance with the characteristic, in each instance, before a first flat item of an order, in each instance, reaches the interaction device, in each instance, as it passes through the flat item channel, whereby the characteristics of the flat item types to be processed in an order, as well as the processing steps undertaken in the processing system, are summarized in a formula and made available to the system, and whereby the adaptation of the interaction device takes place using the characteristics summarized in the formula.

Furthermore, the invention relates to an apparatus for order-based processing of flat items, comprising at least one flat item channel, along which a flat item, in each instance, which items can be configured differently at least in terms of one characteristic, in each instance, particularly a physical characteristic, in accordance with their flat item type, passes through the processing apparatus, and along which channel at least one interaction device is provided, which device interacts physically with the flat items, in each instance, and must be adapted to setting data predetermined in accordance with the characteristic, in each instance, before a first flat item of an order, in each instance, reaches the interaction device, in each instance, as it passes through the flat item channel, and to an electronic memory for storing characteristics of flat item types and related setting data for adaptation of the interaction device, as well as means for adaptation of the interaction device as a function of the flat item type of the order, in each instance, in accordance with the setting data provided in the memory.

Likewise, the invention relates to an electronic interface for electronic communication with a system or apparatus for order-based processing of flat items which can be categorized into flat item types.

Also, the invention relates to an envelope insertion system for order-based processing of flat items, comprising at least one corresponding interface or apparatus described above, as well as at least one network of flat item channels, along which a flat item, in each instance, which can be configured differently at least in terms of one characteristic, in each instance, particularly a physical characteristic, in accordance with its flat item type, passes through the processing system, and along which channel at least one interaction device is provided, which device interacts physically with the flat items, in each instance, and must be adapted to setting data predetermined in accordance with the characteristic, in each instance, before a first flat item of an order, in each instance, reaches the interaction device, in each instance, as it passes through the flat item channel, and at least one device for entry of characteristics of a flat item to be processed, in each instance, whereby the flat item channel network has at least one envelope channel and at least one flat item channel, which meet—if applicable also separate—and whereby flat items that are configured differently at least in terms of one characteristic, in each instance, run along at least one of the flat item channels during an order.

Such envelope insertion systems, apparatuses, and methods, but also corresponding interfaces, are known, for example, from U.S. Pat. No. 7,765,017 B2 but also from U.S. Pat. No. 7,896,335 B2. These are envelope inserters, in each instance, in which documents such as letters, invoices, and the like, and enclosures are combined as material, folded, if necessary, and subsequently placed in an envelope. These flat items that pass through the processing system differ, in terms of their characteristics, not only in accordance with the number of pages that a letter or invoices or other attachments have, but also in accordance with the number of enclosures or the type of folds. This particularly relates, of course, to the thickness and the weight of the entire material, so that a suitable envelope has to be made available by the envelope inserter. But other characteristics, too, such as, for example, the surface composition or the flat items, in each instance, the precise position of an address field, particularly also as a function of the selected folding process, but also the position of possible code blocks or markings on documents, by means of which the number of attachments, the desired enclosures or the like can be indicated, can make it necessary for the system, in each instance, or individual apparatuses through which the flat items pass in this system, to be individually adapted to these characteristics.

For this purpose, the settings to be made are made available to the systems, in each instance, in files called formulas, whereby U.S. Pat. No. 7,896,335 B2 proposes, for creation of the formula, that the physical characteristics of the flat items, in each instance, be recorded in advance in a scanner, and transferred to the envelope inserter together with other setting defaults. In this connection, however, complex defaults, such as different folds, for example, which lead to different thicknesses and, accordingly, to other envelopes to be selected, cannot be taken into consideration for an order, in each instance, because of the limited entry possibilities by way of the scanner. In particular, the corresponding envelope inserter also cannot take processing steps that vary accordingly, such as a different number of enclosures, possible turning processing or the like, into consideration during an order. Furthermore, ultimately multiple measurements are carried out on the same flat items, in order to determine the optimal settings, which can then be adapted and stored, if applicable also manually, by way of a user interface. In particular, this is a stand-alone solution, which therefore results in renewed measurements and corresponding precise adjustments for every further system. A remedy is provided here by U.S. Pat. No. 7,765,017 B2, which makes such formulas available to the system, in each instance, as a file, whereby the formulas are tailored to the individual machine type or system type, in each instance, and must be converted, in each instance, if a different system or machine is selected. This results in a very great number of conversion measures of the formulas, in each instance, which furthermore must be newly created for every system change, for example if individual apparatuses are replaced or if apparatus or system parts undergo maintenance.

DE 600 11 864 T2 and DE 692 02 774 T2 also disclose embodiments in which formulas are used. In this connection, DE 692 02 774 T2 also allows a check that can be carried out by means of corresponding individual test runs.

In this connection, it must be taken into consideration that during an order, up to 10,000 or more individual flat items can pass through a flat item channel of a corresponding apparatus, whereby the flat items can be different, in each instance, depending on the concrete embodiment of the system, and the apparatus must react to this within the shortest possible period of time. Ultimately, mechanisms that are able to do this are already available on the market. However, it must be ensured that such extensive orders pass through in as operationally reliable a manner as possible, and that errors are precluded, to a great extent.

It is the task of the present invention to make available methods, apparatuses, envelope insertion systems, and interfaces of the stated type, in which possible errors, particularly on the basis of incorrect operation, are reduced to a minimum.

As a solution, methods, apparatuses, envelope insertion systems, as well as electronic interfaces having the characteristics of the independent claims are proposed. Further advantageous embodiments are found in the dependent claims and in the present description.

In this connection, the conclusiveness checks and plausibility checks to be carried out, in deviation from DE 692 02 774 T2, before the start of an order, in other words not by means of conducting tests and therefore by means of partial processing of the order, particularly make it possible that even before starting the system, proper processing of an order can be ensured, to a great extent. Particularly in the case of orders with a great variability in different documents, particularly also documents with different numbers of pages, different folds, different enclosures and numbers of enclosures, and, accordingly, different envelopes, all the alternatives of an order can therefore be checked virtually, in advance, in a computer-supported environment; if manual test runs were carried out, this would lead to an amount of effort that would be almost impossible to implement and, in every case, to completely wasteful effort.

In particular, a method for processing of flat items in a processing system, through which system the flat items, in order-based manner, grouped into orders, successively pass through at least one flat item channel, whereby the flat items can be configured differently at least in terms of one characteristic, in each instance, particularly a physical characteristic, in accordance with their flat item type, and at least one interaction device that interacts physically with the flat items, in each instance, is provided along the flat item channel, which device is adapted to setting data predetermined in accordance with the characteristic, in each instance, before a first flat item of an order, in each instance, reaches the interaction device, in each instance, as it passes through the flat item channel, whereby the characteristics of the flat item types to be processed in an order, as well as the processing steps undertaken in the processing system, are summarized in a formula and made available to the system, and whereby the adaptation of the interaction device takes place using the characteristics summarized in the formula, can be characterized in that a conclusiveness check of the formula takes place before the start of an order and adaptation of the interaction device, in that electronically stored system data, particularly also concerning the device interacting with the flat items, in each instance, are electronically reconciled with the formula.

By means of the previous conclusiveness check, it can be ensured that the related system is actually suitable for implementing a corresponding formula.

This method of procedure particularly makes it possible to create a formula, at first, completely independent of the system or apparatus, in each instance, on which this is supposed to be processed. In this way, it becomes possible to create formulas particularly in result-oriented manner, in other words on the basis of the flat items ultimately to be processed.

In particular, in this way it is made possible to compile a formula solely from the characteristics of the flat item type to be processed in an order, as well as the processing steps undertaken in the processing system, so that the formula is at first uncoupled from the processing system, and can be adapted to the corresponding processing system only afterward.

This particularly allows a transfer of formulas to any desired systems, without complex conversion steps being required, which ultimately—particularly in the case of a change in the systems or apparatuses, in each instance—leads to complex reprogramming activities of corresponding conversion programs and possible errors connected with this.

At this point, it should be mentioned that corresponding apparatuses for order-based processing of flat items or corresponding envelope insertion systems are based on orders in which the materials, in other words the documents, such as letters, invoices, individual lists, and the like, and enclosures, and the envelope(s) as well as the number of the individual envelopes or of the flat items and the corresponding formula, in other words the characteristics of the flat item types as well as the processing steps undertaken in the processing system are summarized.

Furthermore, in the present connection, the term "flat item" is used as a general term for printed matter or shipped matter, and therefore includes envelopes and other materials, in other words documents and enclosures. In total, flat items are therefore flat, if applicable printed, bendable and/or foldable objects, which pass through corresponding apparatuses or systems, along a flat item channel. In this connection, the flat item channel refers to the space through which the flat items pass, in each instance, whereby it is directly evident that the characteristics of a flat item can experience changes in terms of their technical characteristics as the result of different processing procedures, such as, for example, a folding procedure or a change in direction by 90° in its surface. Accordingly, the flat item channels will also be adapted and configured differently, in each instance.

As characteristics of the flat items, material characteristics, such as geometric dimensions, thicknesses, and weight are of particular importance. Likewise, application characteristics, such as, for example, the variation of the position of an address field with different folds, are important. The same holds true for possible codes that are applied to documents and must be read by the processing apparatuses and systems, in order to make specific parameters, such as, for example, the number of enclosures or the number of attachments of a letter individually available as an order passes through, so that the apparatus or system can react accordingly. In this connection, such codes can be provided at different positions, so that it must have been ensured, before the start of an order, by means of outfitting or setup activities, that the apparatus or system can actually find and read a corresponding code.

Furthermore, it is understood that the corresponding apparatuses or systems interact with the flat items, in each instance, in different ways. Corresponding interaction devices can be, for example, sorters, envelope inserters, printers, enclosure applicators or ejectors, which can also be provided in an overall system as separate apparatuses, if necessary. Also, scanners, particularly barcode scanners, can interact with the flat items, in each instance, in such systems or apparatuses, and must be positioned in suitable manner before the start of an order, if applicable, so that the flat items that move past them can be accurately scanned, and any codes, for example, can be recognized in operationally reliable manner. In particular, however, transport belts, guides, and transport rollers are interaction devices, which must be adapted to the different flat item types that move past the interaction device, in each instance, during an order.

The processing steps to be carried out, in each instance, such as, for example, "put letter into envelope" or "perform letter fold," can also be found in a formula; these steps, however, can be stored in the formula merely implicitly, in the process management or in the sum of the flat items, such as, for example, corresponding characteristics of a sheet folded according to the letter fold.

The conclusiveness check of the formula, explained above and taking place before the start of the order and the adaptation of the interaction device, can be carried out in the system or in the corresponding apparatus itself, or also in a separate computer system. In this connection, corresponding system data, which are stored, for example, in the system or in a corresponding apparatus, or also separately in a computer, are electronically reconciled with the formula. Thus, for example, it is possible to check to what extent an apparatus or system is suitable at all for processing a flat item of the formula or for undertaking a corresponding processing step, such as a folding procedure, for example. Also, it is possible to check there, for example, whether a flat item channel is sufficiently wide at the discharge, in the first place, to even be able to convey a corresponding envelope once it is filled with all the flat items according to the formula.

By means of this reconciliation, possible non-conclusiveness of the formula that might exist can be effectively determined with regard to the related system or with regard to the corresponding apparatus, so that an order does not even start if it cannot be carried out.

During the conclusiveness check, it can be checked, for example, whether one, preferably all system components, devices, and apparatuses process the related input formats, in other words, for example, a cutting apparatus can cut the raw material, a folding apparatus can fold the cut material, and an enclosure applicator can provide the folded material with enclosures. Likewise, it can be checked, for example, whether on the basis of the existing constellation of the components, the desired method of folding, particularly including the orientation of the envelope in the envelope inserter, actually leads to an address being located in the envelope window. Likewise, it can be checked, for example, whether, if a formula provides for enclosure of CDs, the system has a CD applicator, whereby the result of the conclusiveness check can be, for example, output of corresponding setup data for installation of a CD applicator, or the recommendation that a different system be used. Or, a system can be two different input channels, for example, one for endless paper and/or one for paper that is already cut, and, on the basis of a conclusiveness check, a change in or installation of the corresponding component, or the selection of a corresponding channel, can be recommended, depending on the formula. Other consistency checks, for example whether the related materials can be processed, can also be carried out, whereby here, depending on the concrete implementation, system-specific data, such as, for example, electronic system data sheets, or electronic component-specific or apparatus-specific data sheets can be used for the conclusiveness check. Further tests can also be carried out with regard to rotation, collection, folding, and turning procedures, for example whether a rotation procedure brings about a format that cannot be handled by a subsequent flat item channel.

If the conclusiveness check is successful, then adaptation of the interaction devices takes place; this can preferably take place in accordance with predetermined setting data, for example in accordance with an electronic data sheet. In this connection, the setting data implement the characteristics of the flat items of an order or formula, in each instance, as corresponding control commands for actuators that are provided on the interaction devices. Such actuators can be, for example, stepper motors, cams, adjusting screws, magnets or other actuators known from the state of the art, whereby the corresponding extent of the change is electronically stored in memory in the setting data, as a function of the related characteristic of the flat item type, in each instance.

If possible actuators cannot be electronically controlled, it is advantageous if corresponding setup data concerning setup activities to be performed manually are output before the start of an order, for example by means of a monitor or by means of a printed-out sheet of paper.

After a negative result of the conclusiveness check, a proposal for a change in formula can be output for a changed implementation of the formula and/or for selection of an alternative processing system, using data stored in an electronic memory, for example by means of a monitor or by means of a printed-out sheet of paper. If necessary, it is possible to refer to a memory for storing characteristics of flat item types and related setting data for adaptation of the interaction device of other processing systems, because it can be quickly recognized, on the basis of the listing of characteristics, in operationally reliable manner, to what extent a possible system appears to be suitable for processing flat items with precisely these characteristics. Also, it can be proposed, for example, that in the case of four enclosures in a formula and a system having only three enclosure applicators, one enclosure be left out or, instead, two enclosures be kept on hand alternately in one enclosure applicator. Likewise, a sorting apparatus that does not have any possibility of placing a color marker between flat items, as required for a formula, can be set to select a different differentiation that the apparatus has, for example offset stacking. Also, for example, the use of a turner can be suggested, if the orientation of the envelope does not correspond to the orientation of the address fields, with regard to its window.

As is directly evident, a corresponding formula can be relatively complex and can comprise a great number of different flat items and different processing steps, as well as their characteristics, in each instance. This particularly holds true if the flat item types, in each instance, can be combined in different ways, if they are single-page or multi-page, for example, and comprise a different number of attachments, such as, for example, business terms, supplemental contract documents, and different enclosures, such as prospectus material or advertising, to be enclosed.

In this connection, significant error sources can already exist when a formula is created. These can be reduced if a method for processing flat items in a processing system, through which system the flat items, in order-based manner, grouped into orders, successively pass through at least one flat item channel, whereby the flat items can be configured differently at least in terms of one characteristic, in each instance, particularly a physical characteristic, in accordance with their flat item type, and at least one interaction device that interacts physically with the flat items, in each instance, is provided along the flat item channel, which device is adapted to setting data predetermined in accordance with the characteristic, in each instance, before a first flat item of an order, in each instance, reaches the interaction device, in each instance, as it passes through the flat item channel, whereby the characteristics of the flat item types to be processed in an order, as well as the processing steps undertaken in the processing system, are summarized in a formula and made available to the system, and whereby the adaptation of the interaction device takes place using the characteristics summarized in the formula, is characterized in that in order to create a formula, characteristics of the flat item types in question are compiled from a database to provide the formula, by way of modules in which all the relevant characteristics of a flat item type in question, in each instance, which is supposed to be incorporated into the formula, and/or relevant processing characteristics are summarized. By means of the use of modules in which these characteristics can be found, such as, for example, the information concerning the edge length and the sheet thickness of specific pages, the information concerning the precise position of an address field in certain document versions, the error quota of an individual formula can be reduced to a minimum. In this connection, such modules preferably also comprise redundant data for the actual setting in the processing system, such as, for example, the position of an envelope window. The position of such an envelope window does not influence the machine sequence, for example. However, it makes little sense to fold a letter in such a manner that an address field does not appear in the envelope window. Accordingly, it is advantageous if the modules, in each instance, for example also an envelope, also comprise such geometric characteristics. In this way, a formula can also be created at a desk or away from a machine, apparatus or system, in relatively operationally reliable manner, whereby a corresponding operator can also check at the desk whether or not a formula is plausible in and of itself.

It is understood that “all the relevant characteristics” can be selected in accordance with the degree of desired operational reliability. They should at least include the geometric dimensions. From these geometric dimensions, it can then be checked, for example, whether a correspondingly folded printed item will actually fit into the selected envelope—or not.

In particular, after compilation of a formula or during compilation of a formula and/or of a module, a plausibility check with regard to the modules used and their combinations can be carried out by the formula, whereby the corresponding data stored electronically can be reconciled with one another. In this connection, it should first be checked, for example, whether a specific number of documents lying one on top of the other can be folded in the desired manner, whether a correspondingly folded or compiled group of documents still fits into an envelope, and whether—as already indicated above—a possible address field will actually come to lie in the address window of an envelope if folded as set, or whether an unfolded DIN A4 sheet fits into a C6 envelope, which specifically does not work. Cumulatively or alternatively, it can be checked, for example, whether contradictions in the material properties, such as a net format selected to be larger than a gross format, are present.

The plausibility check can also comprise components of the conclusiveness check, if necessary, for example if a formula is supposed to be assigned to specific systems or apparatuses, and therefore can check, for example, whether a formula can be carried out on the apparatuses and systems of a mail room, or on what apparatuses and systems of a mail room implementation can take place. Likewise, it can be checked whether security checks provided in the formula, for example readout and comparison of the address fields of combined letters and invoices, meet the other security standards of the corresponding formula or of the modules used there. It is true that at least partial linking of conclusiveness check and plausibility check does restrict creation of a formula and appears to run counter to complete independence in creation of a formula. Nevertheless, it makes little sense for a user to create formulas that would not easily run on the user’s own systems and apparatuses. However, formulas created in this way are still independent of a system or apparatus, and can accordingly be used on other systems and apparatuses.

Such a plausibility check is particularly made possible in that the formula is created independent of the processing system being used, in each instance, and therefore can also be checked in abstract manner, because of the consistent implementation of a formula merely in characteristics of the flat item types in question.

In the case of a negative result of the plausibility check, a suggestion for a change in formula can be output, for example by means of a monitor or by means of a printed-out sheet of paper. In this connection, modules for a change in formula can be proposed using a corresponding database with predetermined modules, which are adapted to the flat item characteristics, in each instance. Thus, it is easily possible, for example, to propose a correspondingly larger envelope in the case of a flat item having a certain thickness, which just does not fit into an overly small envelope, which was accordingly determined in a plausibility check. By means of the previously compiled modules with their relevant characteristics, compiled accordingly, a corresponding suggestion can be automatically generated, in order to avoid errors in this manner, if at all possible.

The corresponding method management by way of modules also makes it possible that in the event of a change in a module, for example because a corresponding paper can no longer be delivered or if the position of an address field must be changed, in standard manner, for some reason, a corresponding change can be passed on to formulas created with these modules. This particularly makes a renewed plausibility check of the changed formula possible after this passing on, with regard to the modules used, so that it can be ensured that after such a change, the address field, which has been changed in terms of its position, for example, still comes to lie in an address window of a corresponding envelope.

Particularly during the first creation of a formula, it is possible to offer only modules that already match the formula parts that have already been created and/or match a selected processing system. For example, folding procedures can be excluded if the selected processing system does not fold. Likewise, for example, only large envelopes can be offered as modules, if unfolded A4 paper is supposed to be used for a formula. However, this method of procedure significantly restricts the user in creating a formula, so that this is not necessarily advantageous. Particularly if a change in processing systems is supposed to be made, it can then happen that the possibilities of this processing system have been only insufficiently utilized. On the other hand, creation of a formula is significantly facilitated in this way, and it might be possible to do without a plausibility check. If, however, modules are changed subsequently and passed on to the formula, a corresponding plausibility check is certainly very advantageous, whereby the method of procedure of free formula creation after a plausibility check accordingly permits more freedom in the formula creation.

It can be ensured, by means of an electronic interface for electronic communication with a system or apparatus for order-based processing of flat items that can be categorized into flat item types, which system or apparatus can be set by exclusive input of formulas that summarize characteristics of flat item types to be processed in an order as well as processing steps performed in the processing system, and/or of orders according to which a specific amount of specific flat items is supposed to be processed according to one or more formulas, that formulas independent of the systems or apparatuses are made available and can be executed, in operationally reliable manner, on different systems or apparatuses.

Corresponding implementation of the orders or formulas can then take place in the apparatus or system, in each instance, whereby—if necessary—it is also possible to carry out such implementation in a separate computer system and then to make the implemented information available to the apparatuses or systems, in each instance, as corresponding setting data.

Accordingly, it is possible to do without individual conversion of formulas to different systems and apparatuses; this significantly increases operational reliability, because direct intervention in the formula, in system-specific manner, in each instance, is not necessary. Instead, it is sufficient if the setting data for the characteristics of the flat item types, in each instance, are kept available for the apparatuses and systems, in each instance, whereby ultimately, special personnel or even the manufacturers can be responsible for this. Therefore the actual setting is uncoupled from the operator, in each instance, so that possible errors are reduced to a minimum here, as well.

In this connection, it is understood that if necessary, other interfaces, which allow the exchange of other data, can be provided on corresponding apparatuses or systems, in order to be able to transfer data of characteristics of flat item types and related setting data to the systems and apparatuses or to computers, accordingly.

Accordingly, by means of an apparatus for order-based processing of flat items, comprising at least one flat item channel along which a flat item, in each instance, which can be configured differently at least in terms of one characteristic, in each instance, particularly a physical characteristic, in accordance with its flat item type, passes through the processing apparatus, and along which channel at least one interaction device that interacts physically with the flat items, in each instance, is provided, which device must be adapted to setting data predetermined in accordance with the characteristic, in each instance, before a first flat item of an order, in each instance, reaches the interaction device, in each instance, as it passes through the flat item channel, and an electronic memory for storing characteristics of flat item types and related setting data for adaptation of the interaction device, as well as means for adaptation of the interaction device as a function of the flat item type of the order, in each instance, in accordance with the setting data stored in the memory, as well as an electronic interface for entry of formulas that compile characteristics of flat item types to be processed in an order, as well as processing steps undertaken in the processing system, and/or of orders according to which a specific amount of specific flat items is supposed to be processed according to one or more formulas, a corresponding versatility, according to which formulas for different apparatuses or systems that comprise such apparatuses can be prepared, can be achieved.

The interface or apparatus can have an electronic interface for output of an electronic apparatus data sheet, which at least comprises characteristics of flat item types and related setting data, and, if applicable a characterization of the processing carried out by the system. Such an electronic interface can be provided separately, or also integrated into the electronic interface that has already been explained. In this way, it becomes possible that a formula, in particular, can easily be subjected to a conclusiveness check on a corresponding system or apparatus type. However, if necessary, such a conclusiveness check can also be undertaken in the apparatus or system, whereby then, corresponding output of such data is not necessary.

A corresponding envelope insertion system can have an electronic memory for storage of a system data sheet, which at least comprises characteristics of flat item types and related setting data for adaptation of the interaction device as well as, if necessary, characterization of the processing carried out by the system, such as, for example, envelope insertion, folding and/or sorting, as well as means for adaptation of the interaction device as a function of the flat item type of the order, in each instance, in accordance with the setting data provided in the memory. In this way, a formula can be subjected to a corresponding plausibility check for the entire system, whereby if applicable, such data can also be stored outside of the system. Likewise, in this manner, the entire system is enabled to implement orders, with a formula that merely contains characteristics of flat item types and related processing steps, in that corresponding setting data can be implemented by the data stored in the system. It is understood that—as already indicated above—corresponding implementation of the formula as setting data can also take place outside the system, and accordingly be made available to the system.

The apparatuses or systems can have at least one device for changing the geometric dimensions of the flat item with reference to their inherent movement direction through the processing apparatus. Such a change in the geometric dimensions takes place, for example, if the flat items are folded. Likewise, a corresponding change takes place if the flat item changes its direction of movement with reference to itself, with the exception of a reversal of direction precisely into the opposite direction of movement. In all other cases, a flat item in a transverse format becomes a flat item in a longitudinal format, for example, which must be transported further or conveyed accordingly, with changed characteristics, in a flat item channel.

It is understood that the cross-sections of the flat item channels, in each instance, can be adapted to the corresponding requirements, particularly as they occur during collection or copying of multiple materials to be inserted into envelopes, but also in connection with folding.

It is understood that the characteristics of the solutions described above and in the claims can also be combined, if applicable, in order to be able to implement the advantages cumulatively, accordingly.

Figure 3:
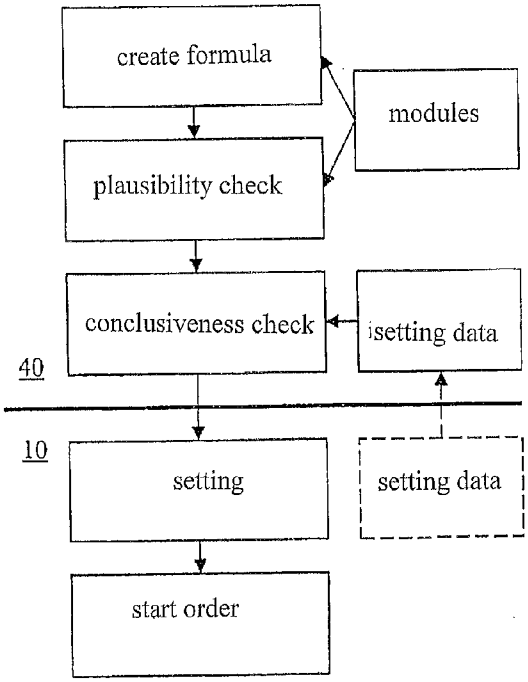
Figure 4:
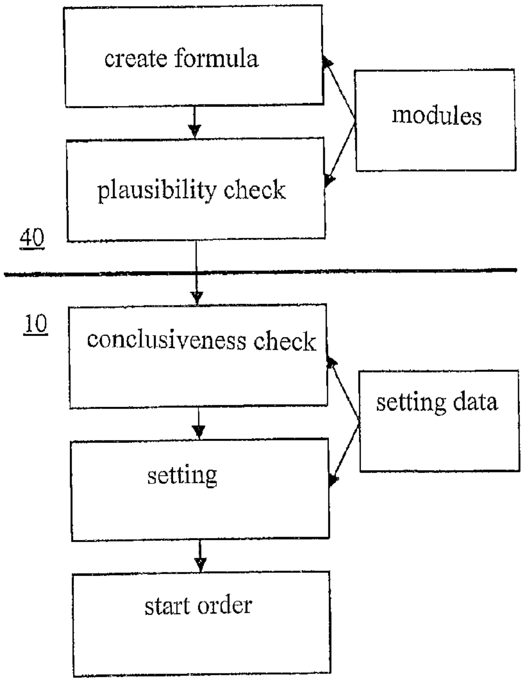
Figure 5:
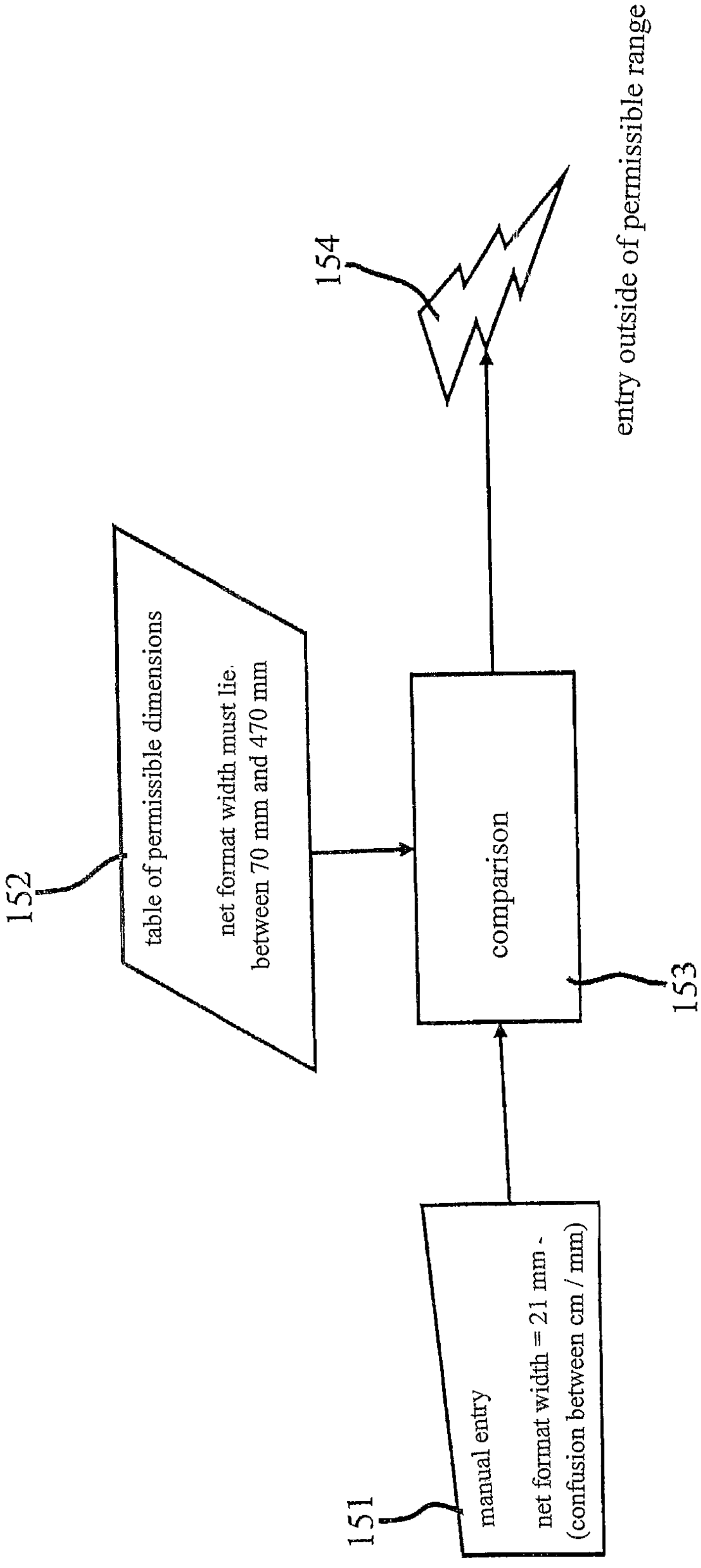
Figure 6:
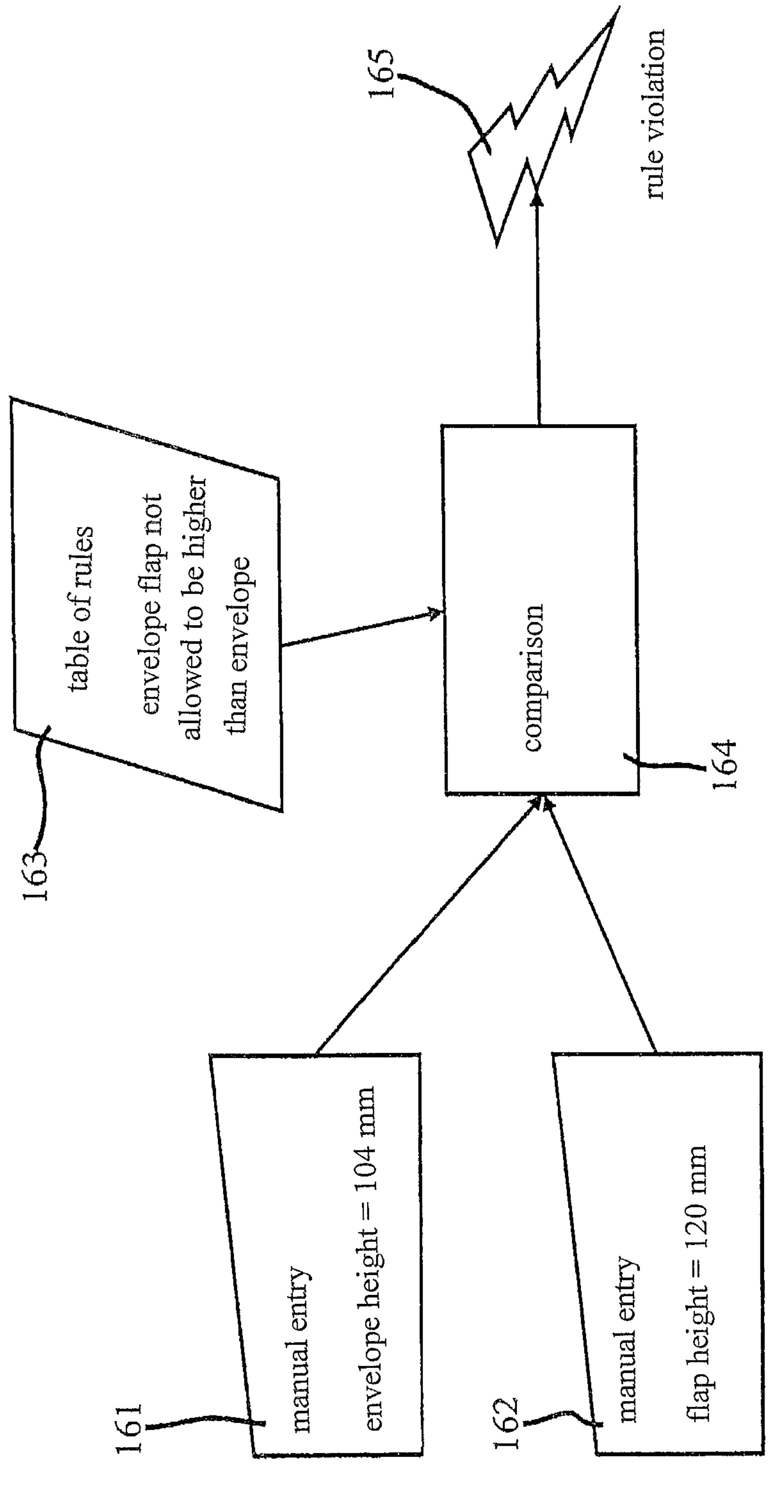
Figure 7:
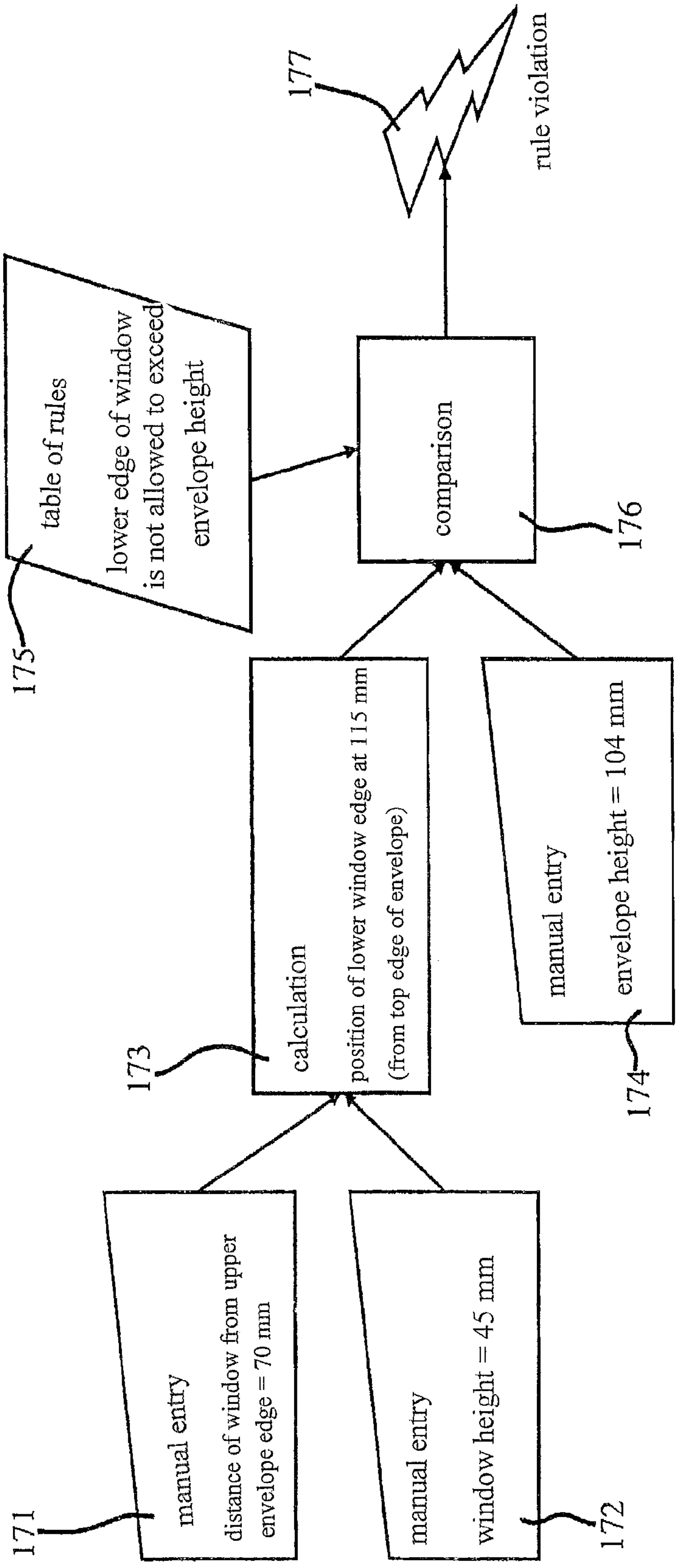
Figure 8:
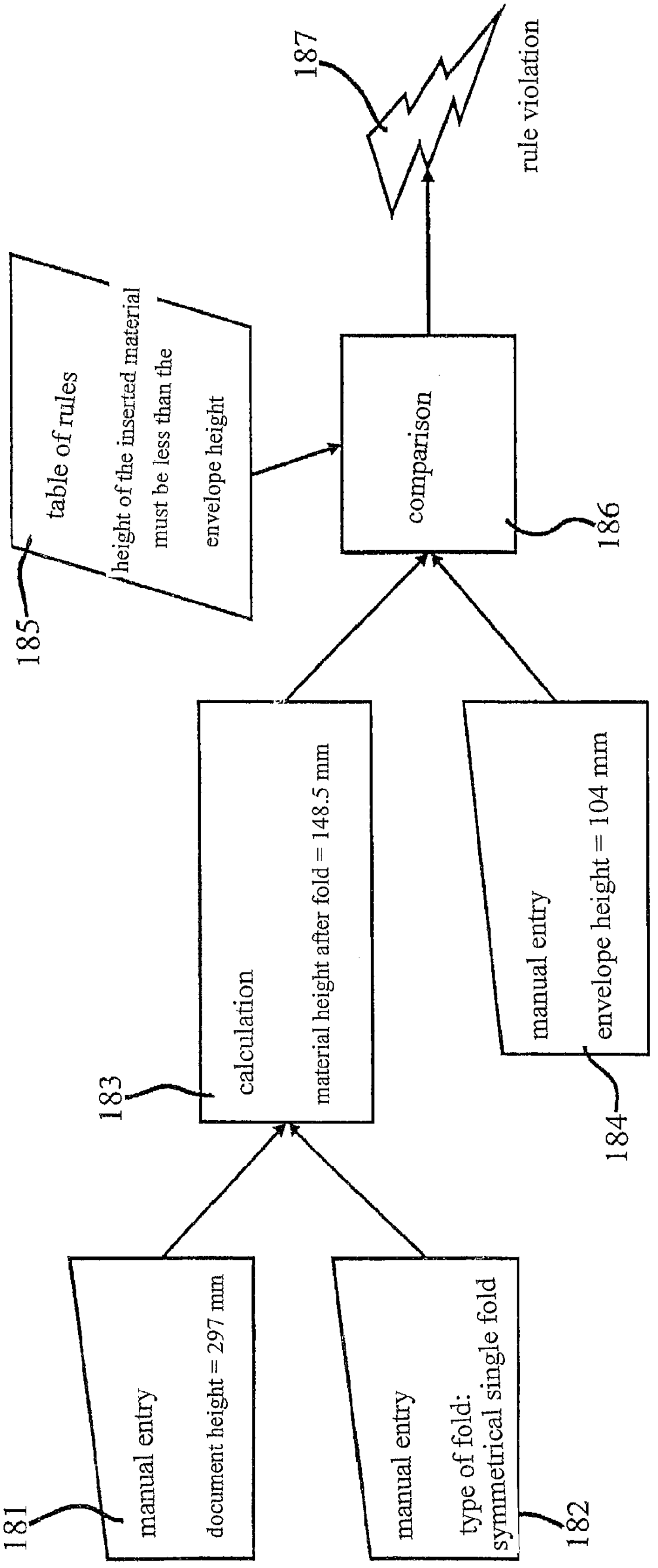
Figure 9:
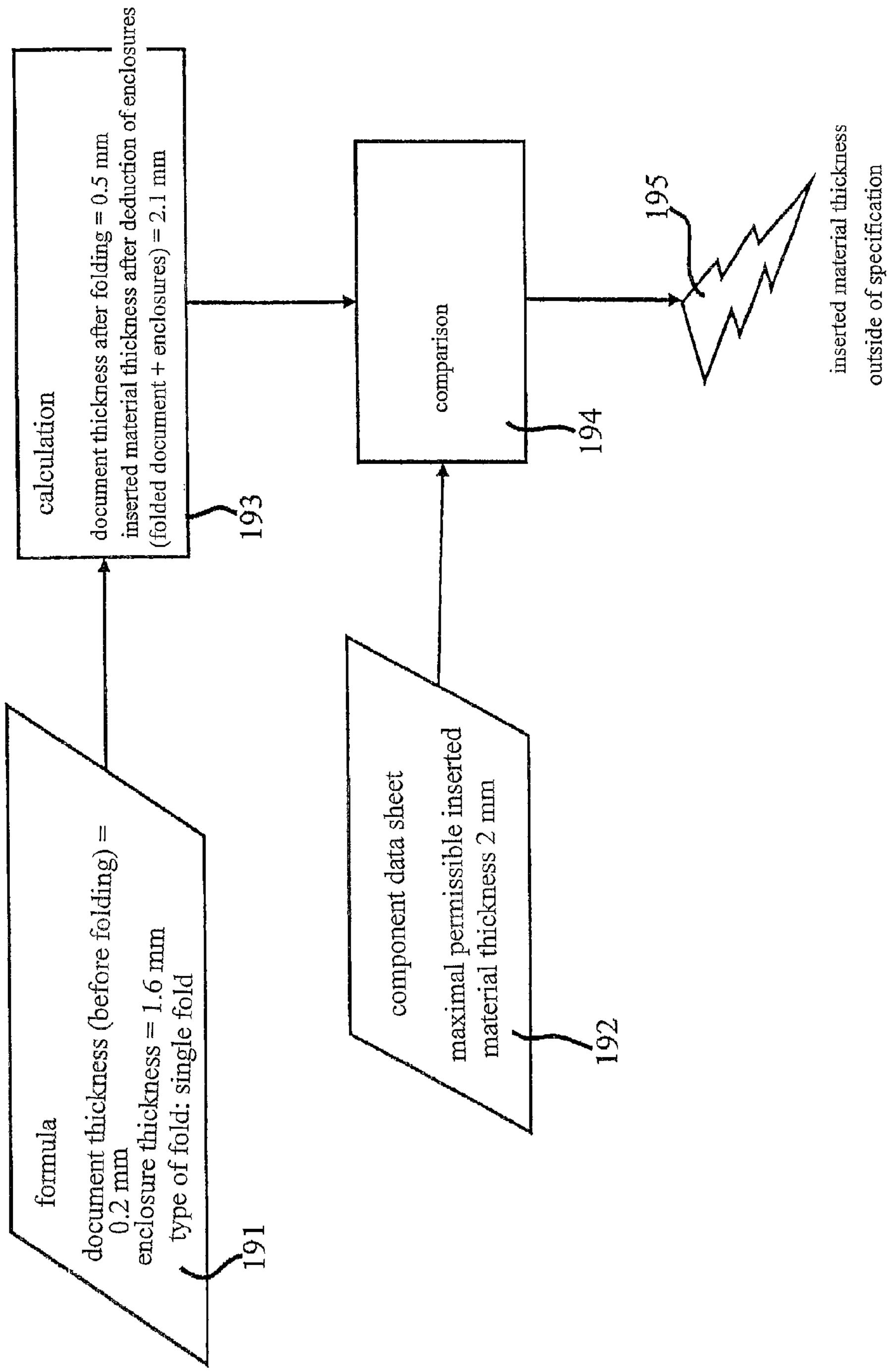
Figure 10:
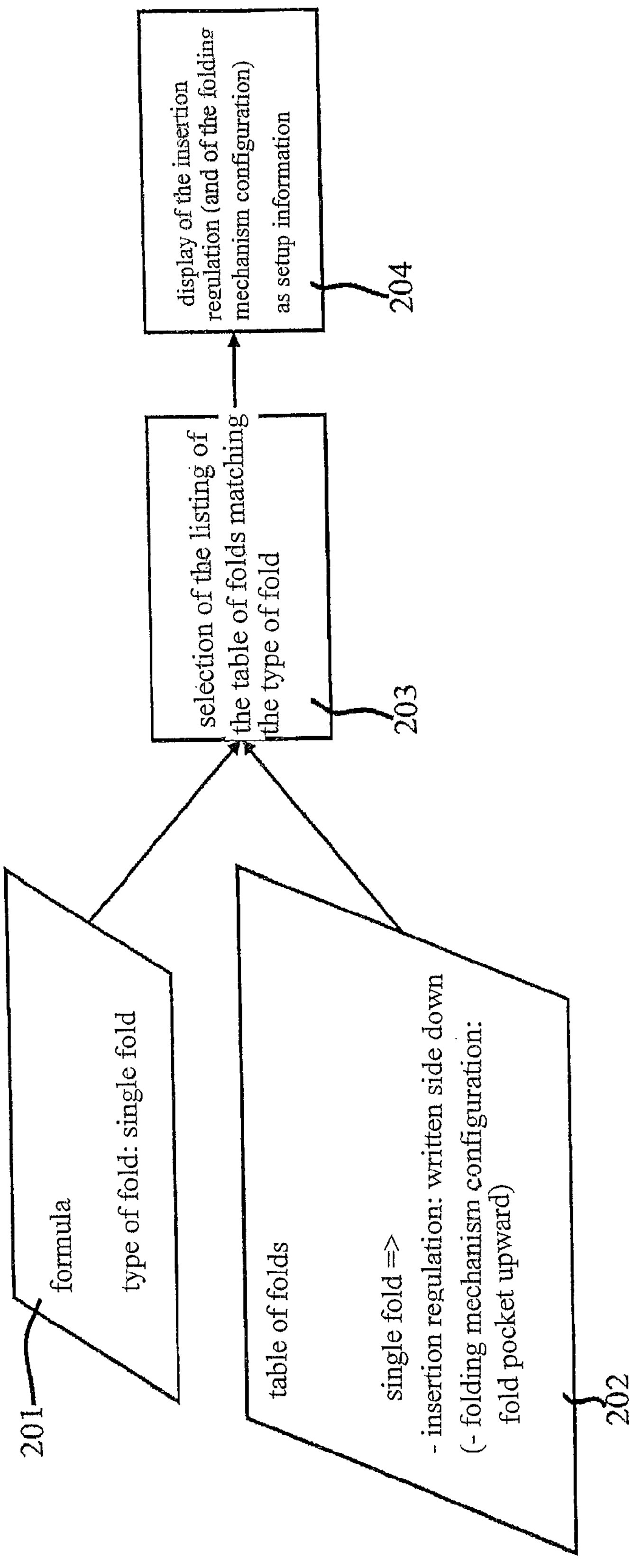

Further advantages, goals, and properties of the present invention will be explained using the following description of exemplary embodiments, which are particularly also shown in the attached drawing. The drawing shows:

FIG. 1 an envelope insertion system in a schematic view;

FIG. 2 the interface provided in the system according to FIG. 1, which interface is also suitable for other envelope insertion systems or processing apparatuses;

FIG. 3 a schematic sequence in the system according to FIG. 1;

FIG. 4 an alternative sequence;

FIG. 5 a sequence for a plausibility check;

FIG. 6 a further sequence for a plausibility check;

FIG. 7 a further sequence for a plausibility check;

FIG. 8 a sequence for a conclusiveness check;

FIG. 9 a sequence for a further conclusiveness check and inclusion of system data; and FIG. 10 a sequence for making setup data available.

In the case of the envelope insertion system 10 shown in FIG. 1, an already printed roll of paper 11 is passed to a cutter 12, which cuts the paper of the already printed rolls 11 in accordance with the preselected format default. Behind this, a merger 13 is disposed, which guides two sheets situated next to one another on the roll 11, which were cut lengthwise, one on top of the other, so that the rolls 11 can also be imprinted in dual-use manner. In a collection station 14, the individual sheets are then collected to produce complete letters, so that it is directly evident that corresponding different numbers of pages and also different letter thicknesses can be found. In this connection, it is possible that the number of pages, in each instance, is predetermined by the order. Frequently, however, there are codes on the first pages of the letters, in each instance, in which the corresponding address field can also be found, for example barcodes, machine-readable numerical codes or the like, whereby if applicable, the address information itself can also be used for a corresponding assignment, which information then establishes, for each individual grouping, how this grouping is to be compiled. After collection in the collection station 14, the material that has been collected in groups, which then represents a separate flat item in and of itself, is passed to a folding mechanism 15. There, this material is folded in accordance with the defaults contained in the formula, whereby here, it is established, for each individual group or for each collected flat item, what folds are possible and practical on the basis of the number of pages. In this way, flat items that consist of very many pages, for example, can no longer be folded.

Subsequently, the flat items prepared in this manner, which once again can be other flat items, depending on how they are folded, are straightened up in a deflection and straightening-up station 16, and moved past enclosure applicators 17. There, different enclosures are individually passed to each flat item moving past, in accordance with the defaults already mentioned, and thereby the flat items are changed very differently, once again, at least in terms of their thickness.

The materials prepared in this manner subsequently reach an envelope insertion head 18 of the envelope insertion system 10. Envelopes are supplied to the envelope insertion head 18 from the other side, from an envelope supply 19. The finished letters in their envelopes leave the envelope insertion system 10 at a discharge transport 20.

It is understood that the individual apparatuses of the envelope insertion system 10 can easily be supplemented with further apparatuses, such as, for example, additional enclosure applicators or a sorting apparatus. Likewise, individual apparatuses can easily be eliminated, if this is desired.

Likewise, it is directly evident that the individual apparatuses must be adapted to different formulas, depending on the order. This particularly relates to a change in the enclosures in the enclosure applicator, but also to changes if the roll 11, for example, consists of paper having a different thickness or different surface composition.

The individual apparatuses of the envelope insertion system 10 are connected with a network 30, for example a bus system, a LAN (Local Area Network), a WLAN or the Internet, by way of network connections 35, whereby in FIG. 1, such network connections 35 are shown only for an enclosure applicator 17, the envelope insertion head 18, and the envelope supply 19. Depending on the concrete design of a corresponding envelope insertion system, only one network connection 35 can also be provided, to the extent that corresponding data processing takes place within the system. Likewise, it is understood that every or almost every apparatus of the envelope insertion system can have its own network connection 35.

A computer 40 is likewise connected with the network 30, by way of a network connection 35, by way of which computer formulas can be created from modules situated in a database, checked for plausibility and conclusiveness, and passed on to the envelope insertion system 10 separately or in the form of orders.

For the latter, an interface is provided, which, in the case of this exemplary embodiment, is structured merely in order-based manner, and comprises the order, in each instance, as well as the related formula, in which the characteristics of the flat items, in each instance, are summarized.

In this connection, the method of procedure shown in FIG. 3 appears to be practical. Using the collection of modules present in a database of the computer 40, a formula is created. This is then subjected to a plausibility check, whereby it is clarified, for example, to what extent an address field of a letter comes to lie in the address window of a corresponding envelope even after collection of the letters and possible folding procedures. After the plausibility check, a conclusiveness check for the envelope insertion system 10, in each instance, takes place, which check is also still carried out in the computer 40. For this purpose, setting data that are stored with regard to characteristics of flat item types, in each instance, and which ultimately represent the envelope insertion system 10, in each instance, are compared with the characteristics that the formula demands. These setting data are also stored in the computer 40 in the case of the present exemplary embodiment. They can be stored in the envelope insertion system 10, in an alternative embodiment, and can be passed on to the computer 40 by way of a separate interface.

The formula, checked for conclusiveness, is then passed on to the envelope insertion system 10 by way of the interface according to FIG. 2. There, setting takes place automatically, to the greatest possible extent, by means of corresponding actuators as well as predetermined setting data. If applicable, manual setup activity is demanded by the envelope insertion system 10, for example if the actuators to be set, such as adjusting screws or the like, cannot be controlled electronically.

As soon as setting has taken place, the corresponding order can be started.

The setting data required in the envelope insertion system 10 for setting can be stored separately. However, it is also possible that storage takes place in a corresponding database or table, which then can also be electronically exportable and/or can be used for the conclusiveness check.

In this regard, alternative method management, as shown in FIG. 4, can also be provided, in which such setting data are used for the conclusiveness check. In this connection, in the method management proposed in FIG. 4, the conclusiveness check takes place in the envelope insertion system 10 itself, whereby it is understood that use of such setting data for a conclusiveness check carried out outside of the envelope insertion system 10 is possible if the setting data are accordingly exported by way of a suitable interface.

It is understood that the corresponding transfers to the envelope insertion system 10 can also be undertaken for each individual apparatus itself. Likewise, it is possible that each individual apparatus independently carries out its own conclusiveness check or that a conclusiveness check is carried out in the computer 40 for each individual apparatus separately.

Parameters of a module entered for a plausibility check can be subjected to a plausibility check, for example.

Thus, for example, as shown in FIG. 5 as an example, a manual entry 151 can be checked for plausibility, in that the manual entry 151 is compared with a table 152 of permissible values in a comparison 153, whereby a rule violation 154 is recognized in the event of a manual entry 151 outside of a permissible range.

Corresponding recognition can be implemented, for example, in that the corresponding entry is not accepted for storage in memory and further entries are not possible until a correct value is output. Likewise, a rule violation 154 can be made evident by means of a marking, for example by means of a red color background or other identifier. This them makes it possible to continue to work on the module speedily, in order to be able to correct corresponding incorrect entries in retrospect. Likewise, a reason for revising the table 152 of permissible values could arise from such a marking.

In a practical implementation, entry of a net format width of 21 mm, for example, which could very likely be based on confusion between centimeter and millimeter information, can be recognized as a rule violation 154 by means of the comparison 153.

The table 152 can be stored with the software, on the one hand, or in a database, on the other hand.

Aside from a plausibility check with regard to absolute dimensions, logical entry errors can also be caught by a plausibility check, as shown as an example in FIG. 6. Thus, two manual entries 161, 162, for example for an envelope height and a flap height, can be compared in a comparison 164 as provided by a table of rules 163, whereby relative information between the two manual entries 161, 162 are stored in the table of rules 163, which can also be done, depending on the concrete implementation of the present invention, by means of keeping the rules on hand in a database or, alternatively, by means of direct programming of the software.

In a concrete implementation, for example, an envelope height of 104 mm and a flap height of 122 mm can be recognized as logically wrong, and therefore can be represented as a rule violation 165, because an envelope flap cannot be higher than the envelope itself.

Even more complex sequences can be provided in the case of a plausibility check, as shown in FIG. 7. Here, the position of the lower window edge from the upper envelope edge is determined from two manual entries 171, 172, which relate to the window distance of a window envelope from the upper envelope edge and to the window height, in the calculation 173. Of course, as stored in the table of rules 175, this position cannot exceed the envelope height. If applicable, a rule violation 177 can then be recognized by means of a comparison 176 with the manual entry 174 of the envelope height.

If, for example, 70 mm is entered as the window distance from the upper envelope edge during the manual entry 171, and 45 mm is entered as the window height and during the manual entry 172, then from this, during the calculation 173, a position of the lower window edge of 115 mm from the upper envelope edge is calculated. This lower window edge would lie outside of the envelope in the case of an envelope height of 104 mm entered by way of the manual entry 174, and is therefore physically impossible.

It is understood that the tables of rules 163 and 175, if applicable also the table 152 of permissible dimensions, can be placed within a table or also within a database. Likewise, they can be implemented in terms of program technology, within a common software.

A formula can also be subjected to a plausibility check, as shown in FIG. 8, for example, whereby manual entries, if applicable, such as, for example, the manual entries 181, 184, can be derived from corresponding modules. Thus, for example, the manual entry 181 concerning a document height can be used with the manual entry 182 concerning the type of fold in a calculation 183 for calculating the height of the material after folding. In a comparison 186, the material height calculated in the calculation 183 can be compared with the manual entry 184 of the envelope height and—taking a table of rules 185 into consideration—a rule violation 187 can be recognized, if the material height exceeds the envelope height. Then, the folded document does not fit into the envelope.

Aside from a plausibility check of the modules of a formula relative to one another and the linking with one another in the formula, as shown as an example in FIG. 8, a conclusiveness check of the formula can also take place with regard to system data, as shown as an example in FIG. 9. Thus, for example, a formula 191 with a given document thickness before folding, with a given enclosure thickness, and with a given type of fold can be subjected to a calculation 193, in order to determine the document thickness after folding, the inserted material thickness after deduction of the enclosure, in other words the thickness of the folded documents and of the enclosures, and to be able to compare this with system data from a component data sheet 192 concerning the maximal permissible inserted material thickness, in a comparison 194. If the inserted material thickness lies outside of the predetermined specification of the component data sheet 192, a rule violation 195 is recognized.

Thus, for example, a document thickness before folding of 0.2 mm, an enclosure thickness of 1.6 mm with a single fold leads to a document thickness after folding of 0.5 mm, which then leads to an inserted material thickness of 2.1 mm, which would lead to a rule violation 195, for example, at a maximal permissible inserted material thickness of 2 mm, which is predetermined in the component data sheet 192.

In the event of a rule violation 165, 177, 187 or 195, on the one hand the marking or block until the correct entry is made, as already mentioned initially, can take place. On the other hand, in the event of such rule violations 165, 177, 187 or 195, suggestions can be made to a user from a database, as to how or within what limits the entered parameters could read, under reasonable conditions. In this connection, the suggestions are preferably very different in terms of type. Thus, in the exemplary embodiment shown in FIG. 8, it can be suggested to use a different type of fold or a different envelope. In the exemplary embodiment shown in FIG. 9, on the other hand, the use of a different, more suitable system can be suggested as an alternative, aside from the aforementioned suggestions.

Before the start of an order, as shown in FIG. 10, for example, setup data, for example a selection 203 of an entry from the table of folds 202 matching a type of fold provided for by a formula 201 can be represented from the formula 201 with the inclusion of system data, for example a table of folds 202, in a display 204, for example as a laying-in instruction or a folding mechanism configuration, or by means of another output, for example by means of a corresponding printout. An operator can then implement the corresponding setup data and lay corresponding documents in with the printed side up or down, for example, depending on the display 204, or also can perform refitting by means of a manual adjustment of a corresponding folding mechanism configuration, for example fold pocket up or down, depending on the display 204, which decides in what direction the fold is made.

Thus, for example, a type of fold can be provided as a single fold by means of the formula 201. At a predetermined folding mechanism configuration, for example with a fold pocket up, this leads to a corresponding laying-in instruction, for example printed side down, which can be predetermined accordingly in the system-specific table of folds 202.

Depending on the concrete system, no possibility of changing the folding mechanism configuration exists, so that changes in the fold can only be taken into account by means of changed laying-in instructions. In the case of other systems, however, it is possible that the folding mechanism configuration can be adapted manually, and this can then be displayed accordingly.

Cumulatively or alternatively, in the case of a conclusiveness check, for example, a formula can be checked for the presence of required enclosure applicators, such as, for example, for the presence of an applicator for CDs, if the formula provides for CDs as an enclosure, in that a corresponding comparison with data in the component data sheets of the system takes place. As a result of the conclusiveness check, corresponding setup data can then be output, if applicable, which suggests installation of a CD applicator or the selection of a different system, for example. Likewise, the installation or remodeling or the selection of input channels, for example of an input channel for endless paper and an input channel for individual sheets, can be required or suggested as the result of a conclusiveness check.

By means of the prior conclusiveness check or by means of the prior plausibility check, very complex orders, in which the most varied configurations, for example very different numbers of pages, different enclosures, and therefore correspondingly different types of folds and envelope sizes are combined, can particularly be prepared, so that the likelihood of process interruptions can be reduced to a minimum. This leads to a significant increase in process reliability and therefore in throughput, particularly in the case of very large-volume orders.

REFERENCE SYMBOL LIST

10 envelope insertion system
11 roll
12 cutter
13 merger
14 collection station
15 folding mechanism
16 deflection and straightening-up station
17 enclosure applicator
18 envelope insertion head
19 envelope supply
20 discharge transport
30 network
35 network connection
40 computer
151 manual entry
net format width=21 mm
(confusion between cm/mm)
152 table of permissible dimensions
net format width must lie between 70 mm and 470 mm
153 comparison
154 rule violation
entry outside of permissible range
161 manual entry
envelope height=104 mm
162 manual entry
flap height=120 mm
163 table of rules
envelope flap not allowed to be higher than envelope
164 comparison
165 rule violation
171 manual entry
distance of window from upper envelope edge=70 mm
172 manual entry
window height=45 mm
173 calculation
position of lower window edge at 115 mm (from top edge of envelope)
174 manual entry
envelope height=104 mm
175 table of rules
lower edge of window is not allowed to exceed envelope height
176 comparison
177 rule violation
181 manual entry
document height=297 mm
182 manual entry
type of fold: symmetrical single fold
183 calculation
material height after fold=148.5 mm
184 manual entry
envelope height=104 mm
185 table of rules
height of the inserted material must be less than the envelope height
186 comparison
187 rule violation
191 formula
document thickness (before folding)=0.2 mm
enclosure thickness=1.6 mm
type of fold: single fold
192 component data sheet
maximal permissible inserted material thickness 2 mm
193 calculation
document thickness after folding=0.5 mm
inserted material thickness after deduction of enclosures (folded document+enclosures)=2.1 mm
194 comparison
195 rule violation

201 formula
type of fold: single fold
202 table of folds
single fold=>
insertion regulation: written side down
(folding mechanism configuration: fold pocket upward)
203 selection of the listing of the table of folds matching the type of fold
204 display of the insertion regulation (and of the folding mechanism configuration) as setup information

The invention claimed is:

1. A method for processing of flat items in a processing system, the method comprising the steps of:
successively passing the flat items, in order-based manner, grouped into orders, through at least one flat item channel,
configuring the flat items differently in terms of a characteristic, in each instance, in accordance with their flat item type,
providing along the flat item channel an interaction device that interacts physically with the flat items, in each instance,
adapting the interaction device to set data predetermined in accordance with the characteristic, in each instance, before a first flat item of an order, in each instance, reaches the interaction device, in each instance, as the first flat item of the order passes through the flat item channel,
summarizing the characteristics of the flat item types to be processed in an order and the processing steps undertaken in the processing system in a formula and making the characteristics of the flat item types to be processed in an order and the processing steps undertaken in the processing system available to the system,
using the characteristics summarized in the formula in the step of adapting the interaction device,
performing a conclusiveness check of the formula before the start of an order and the adaptation of the interaction device, and
electronically reconciling electronically stored system data, in each instance, with the formula.

2. The method according to claim 1, wherein before the start of an order, setup data concerning setup activities to be performed manually are output to a monitor or a printer.

3. The method according to claim 1, wherein after a negative result of the conclusiveness check, a proposal for a change in formula, for changed implementation of the formula and/or for selection of an alternative processing system is/are output using data stored in an electronic memory to a monitor or a printer.

4. A method for processing of flat items in a processing system, the method comprising the steps of:
successively passing the flat items, in order-based manner, grouped into orders, through at least one flat item channel,
configuring the flat items differently in terms of a characteristic, in each instance, in accordance with their flat item type,
providing along the flat item channel an interaction device that interacts physically with the flat items, in each instance,
adapting the interaction device to set data predetermined in accordance with the characteristic, in each instance, before a first flat item of an order, in each instance, reaches the interaction device, in each instance, as the first flat item of the order passes through the flat item channel,
summarizing the characteristics of the flat item types to be processed in an order, and the processing steps undertaken in the processing system in a formula and making the characteristics of the flat item types to be processed and the processing steps undertaken in the processing system available to the system,
using the characteristics summarized in the formula in the step of adapting the interaction device,
compiling characteristics of the flat item types in question from a database to provide the formula, by way of modules in which all the relevant characteristics of a flat item type in question, in each instance, which is supposed to be incorporated into the formula, and/or relevant processing characteristics are summarized.

5. The method according to claim 4, wherein after compilation or during compilation of a formula and/or of a module, a plausibility check with regard to the modules used and their combinations is performed by the formula.

6. The method according to claim 5, wherein in the event of a negative result of the plausibility check, a proposal for a change in formula is output to a monitor or a printed-out sheet of paper.

7. The method according to claim 4, wherein a change in a module is passed on to a formula created with this module.

8. The method according to claim 7, wherein after the change is passed on, a plausibility check of the changed formula with reference to the modules used is carried out.

9. The method according to claim 4, wherein only modules that match the formula parts already created and/or match a selected processing system are offered.

10. An electronic interface for electronic communication with a system or apparatus for order-based processing of flat items that can be categorized into flat item types, the system or apparatus comprising a control mechanism to perform process steps associated with the flat items and an apparatus which materially transforms the flat items acted on, the electronic interface adapted for an exclusive input of formulas that summarize characteristics of flat item types to be processed in an order and processing steps performed in the processing system, and/or of orders according to which a specific amount of specific flat items is supposed to be processed according to one or more formulas.

11. An apparatus for order-based processing of flat items, comprising:
at least one flat item channel along which a flat item, in each instance, which can be configured differently at least in terms of one characteristic, in each instance, in accordance with its flat item type, passes through the processing apparatus,
a control mechanism for the apparatus to perform process steps associated with the flat items,
an interaction device that interacts physically with the flat items, in each instance, provided along the flat item channel, which interaction device must be adapted to setting data predetermined in accordance with the characteristic, in each instance, before a first flat item of an order, in each instance, reaches the interaction device, in each instance, as it passes through the flat item channel, and
an electronic memory for storing characteristics of flat item types and related setting data for adaptation of the interaction device, as well as means for adaptation of the interaction device as a function of the flat item type of the order, in each instance, in accordance with the setting data stored in the memory,
the electronic memory comprising an electronic interface for entry of formulas that compile characteristics of flat item types to be processed in an order and processing steps undertaken in the processing system, and/or of orders according to which a specific amount of specific flat items is supposed to be processed according to one or more formulas.

12. The electronic interface according to claim 10, comprising an electronic interface for output of an electronic apparatus data sheet, which at least comprises characteristics of flat item types and related setting data, and, if applicable, a characterization of the processing carried out by the system.

13. An envelope insertion system for order-based processing of flat items, comprising:

an electronic interface according to claim 10, a network of flat item channels, along which a flat item, in each instance, which can be configured differently at least in terms of one characteristic, in each instance, in accordance with its flat item type, passes through a processing system, an interaction device provided along a flat item channel of the flat item channels, which interaction device interacts physically with the flat items, in each instance, and must be adapted to setting data predetermined in accordance with the characteristic, in each instance, before a first flat item of an order, in each instance, reaches the interaction device, in each instance, as it passes through the flat item channel, and a device for entry of characteristics of a flat item to be processed, in each instance, wherein the flat item channel network has at least one envelope channel and at least one flat item channel, which meet and wherein flat items that are configured differently at least in terms of one characteristic, in each instance, run along at least one of the flat item channels during an order.

14. The envelope insertion system according to claim 13, further comprising an electronic memory for storage of a system data sheet, which at least comprises characteristics of flat item types and related setting data for adaptation of the interaction device as well as, if necessary, characterization of the processing carried out by the system, and a controller for adaptation of the interaction device as a function of the flat item type of the order, in each instance, in accordance with the setting data provided in the memory.

15. The envelope insertion system according to claim 13, further comprising a device for changing the geometric dimensions of the flat item with reference to their inherent movement direction through the processing apparatus.

16. The envelope insertion system according to claim 13, further comprising at least one device for adaptation of the cross-section of the flat item channel.

* * * * *